United States Patent [19]
Smith et al.

[11] Patent Number: 4,757,415
[45] Date of Patent: Jul. 12, 1988

[54] POWER ACTIVE FILTER EMPLOYING POSITIVE SEQUENCE FILTERING

[75] Inventors: Geoffrey M. Smith, Reisterstown, Md.; Eric J. Stacey, Penn Hills Township; Allegheny County, Pa.

[73] Assignee: Westinghouse Electric Corp., Pittsburgh, Pa.

[21] Appl. No.: 26,244

[22] Filed: Mar. 16, 1987

[51] Int. Cl.$^4$ .............................................. H02H 3/26
[52] U.S. Cl. .................................... 361/76; 361/85; 367/3
[58] Field of Search ............... 361/76, 85, 86; 307/3, 307/4; 323/210

[56] References Cited
U.S. PATENT DOCUMENTS 3,825,815 7/1974 Gyugyi et al. .................. 307/105
4,479,160 10/1984 Stacey .................................. 361/76
4,669,024 5/1987 Stacey .................................. 361/85

Primary Examiner—A. D. Pellinen
Assistant Examiner—Derek S. Jennings
Attorney, Agent, or Firm—R. P. Lenart

[57] ABSTRACT

A power active filter circuit for an electric power system includes a reference generator for producing a plurality of balanced, constant amplitude, positive sequence, AC reference voltages, each being phase-locked to a corresponding phase voltage of the power system. Error signals are produced by subtracting the reference voltages from their corresponding phase voltages and a plurality of correction signals, which are proportional to the error signals, are combined with the phase voltages to produce a plurality of output voltages having substantially only a fundamental component.

5 Claims, 3 Drawing Sheets

POWER ACTIVE FILTER EMPLOYING POSITIVE SEQUENCE FILTERING

BACKGROUND OF THE INVENTION

This invention relates to electronic circuitry and more particularly to power filters which are used to improve the waveform quality in multiple phase power systems.

Some AC power supply applications require high quality sine wave outputs. For example, in aircraft electrical systems, specifications call for a 4% maximum total harmonic distortion, a 4% maximum voltage imbalance for a ⅔ per unit load unbalance, and a 0.9% maximum modulation. These requirements can be difficult to meet due to the high source impedances of typical aircraft generators and other characteristics of these sources.

Active power filters have been designed for insertion between such electrical power sources and a load to generate a synthetic ripple which opposes and effectively eliminates an electrical ripple generated by the power sources. One such active power filter is disclosed in U.S. Pat. No. 3,825,815, issued July 23, 1974 to Gyugyi et al.

Typical power active filters operate with separate reference waveforms for individual phases. Those filters do not force a balanced output and therefore do not necessarily minimize the volt-amps handled by each power active element. As a result, one reactive element could be required to produce higher volt-amps than necessary. It is therefore desirable to produce a power active filter which minimizes the volt-amp rating requirements of the individual series connected power active filter elements.

SUMMARY OF THE INVENTION

Power active filters constructed in accordance with the present invention combine a multi-phase phase locked loop and positive sequence filter with a power amplifier to improve the waveform characteristics on a set of power supply mains by reducing voltage imbalance, decreasing distortion and lowering modulation. These power active filters generate a plurality of balanced, constant amplitude positive sequence AC reference voltages which are phase locked to corresponding ones of a plurality of phase voltages of a multiple phase electric power system. The difference between each of these reference voltages and each corresponding phase voltage is used to produce a plurality of error signals. Correction signals are produced in response to the error signals and combined with the phase voltages to produce a plurality of output voltages having substantially only a fundamental component.

Power active filters constructed in accordance with this invention comprise a means for generating the above AC reference voltages, means for producing the error signals, means for creating the correction signals, and means for combining the correction signals with corresponding ones of the phase voltage. By combining the unique characteristics of a multi-phase, phase locked synthesized waveform generator and a multi-phase positive sequence filter, the present invention can be used to produce a high quality voltage on the mains, while minimizing the volt-amp rating requirements for the reactive power active filter elements.

DESCRIPTION OF THE PREFERRED EMBODIMENT

Figure 1:
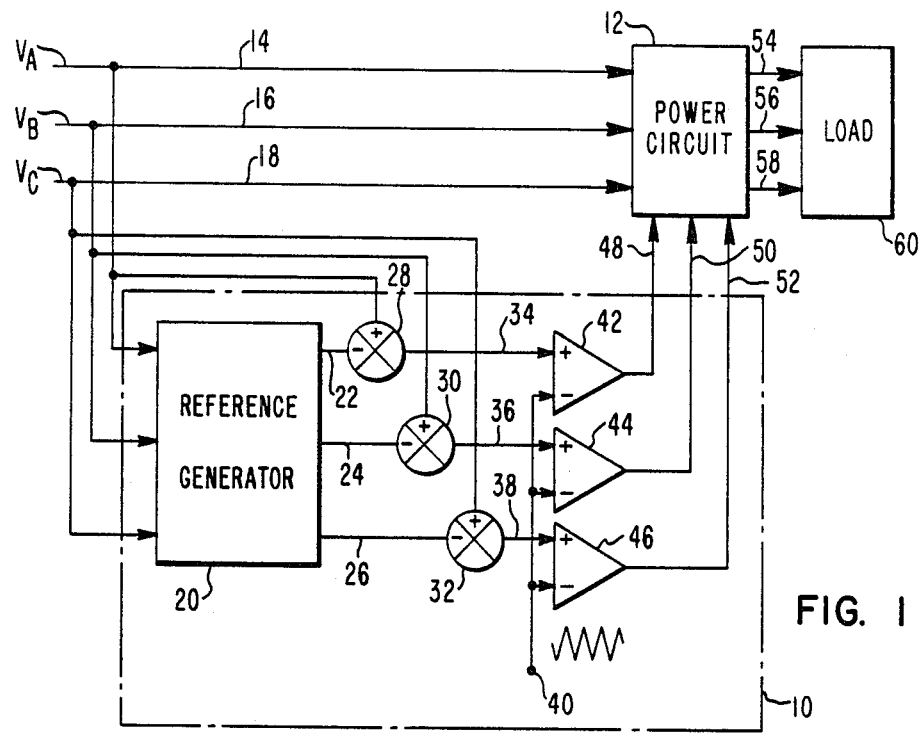
FIG. 1 is a block diagram of a power active filter constructed in accordance with one embodiment of the present invention.

Power active filters add and subtract voltage to the mains of a power system in a manner which improves voltage waveform quality. Such filters include a control circuit and a power circuit. Referring to the drawings, FIG. 1 is a block diagram of a power active filter constructed in accordance with the present invention. This filter includes a control circuit 10 and a power circuit 12. The control circuit is connected to the power system mains 14, 16 and 18 and includes a reference generator 20 which produces a plurality of balanced, constant amplitude positive sequence AC reference voltages on lines 22, 24 and 26. Each of these reference voltages is phase locked to a corresponding one of the phase voltages $V_A$, $V_B$ or $V_C$ on mains 14, 16 and 18. The reference voltages are subtracted from the corresponding mains voltages at junction points 28, 30 and 32 to yield error signals on lines 34, 36 and 38. A triangular waveform is supplied on terminal 40. Comparators 42, 44 and 46 compare the error signals with the supplied triangular waveform to produce a plurality of correction signals on lines 48, 50 and 52. The power circuit then includes means for combining the correction signals with the corresponding ones of the phase voltages to produce a plurality of output voltages on output lines 54, 56 and 58 such that the voltages supplied to the load 60 comprise substantially only a fundamental component.

Figure 2:
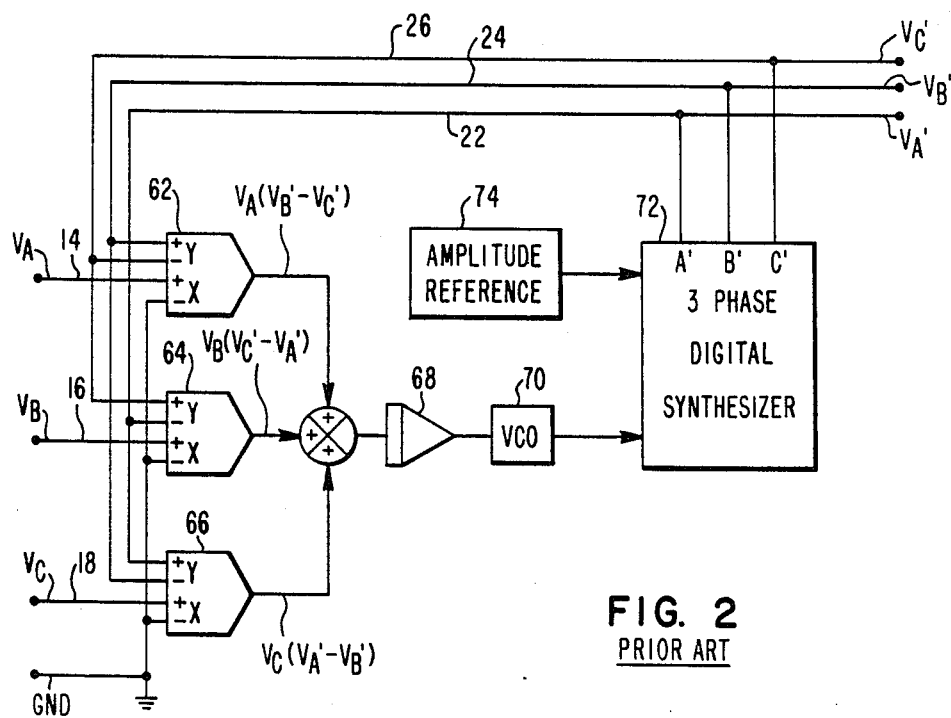
FIG. 2 is a block diagram of a prior art reference generator used in the circuit of FIG. 1.

FIG. 2 is a block diagram of the reference generator 20 of FIG. 1. The circuit described in FIG. 2 is disclosed in U.S. Pat. No. 4,669,024, issued May 26, 1987 to E. J. Stacey. This circuit utilizes differential analog multipliers 62, 64 and 66 to multiply the line-to-line synthesized outputs $V_A'$, $V_B'$ and $V_C'$ by the line-to-neutral source inputs so that the outputs are phased locked with the source voltage signals. Each of the differential multipliers has differential inputs X and Y that are indicated by plus and minus signs. Thus the differential inputs are $+Y$, $-Y$, $+X$ and $-X$ for each differential multiplier. The $-X$ input of each of the multipliers is connected to the system ground GND. This represents a zero value input at that point. The three source phase voltages are connected to the $+X$ inputs of the multipliers. The synthesized positive sequence output reference signals are connected to the $+Y$ and $-Y$ inputs as shown. The output of differential multiplier 62 is $V_A(V_B'-V_C')$, the output of differential multiplier 64 is $V_B(V_C'-V_A')$ and the output of differential multiplier 66 is $V_C(V_A'-V_B')$. Vectorial analysis of the quantities within the parenthesis will show that the quantity $(V_B'-V_C')$ lags the input $V_A$ of the source signal by 90°. Similarly, the quantities $(V_C'-V_A')$ and $(V_A'-V_B')$ lag by 90° the inputs $V_B$ and $V_C$ respectively. A non-inverting integrator is used to maintain phase lock so that $V_A'$ is in-phase with $V_A$, $V_B'$ is in phase with $V_B$ and $V_C'$ is in-phase with $V_C$. The output of integrator 68 is fed to a voltage controlled oscillator 70 which produces a plurality of output pulses that are used by the three-phase digital synthesizer 72 in combination with a DC signal provided by amplitude reference 74 to produce the phase locked positive sequence reference signals $V_A'$, $V_B'$ and $V_C'$ on lines 22, 24 and 26.

Figure 3:
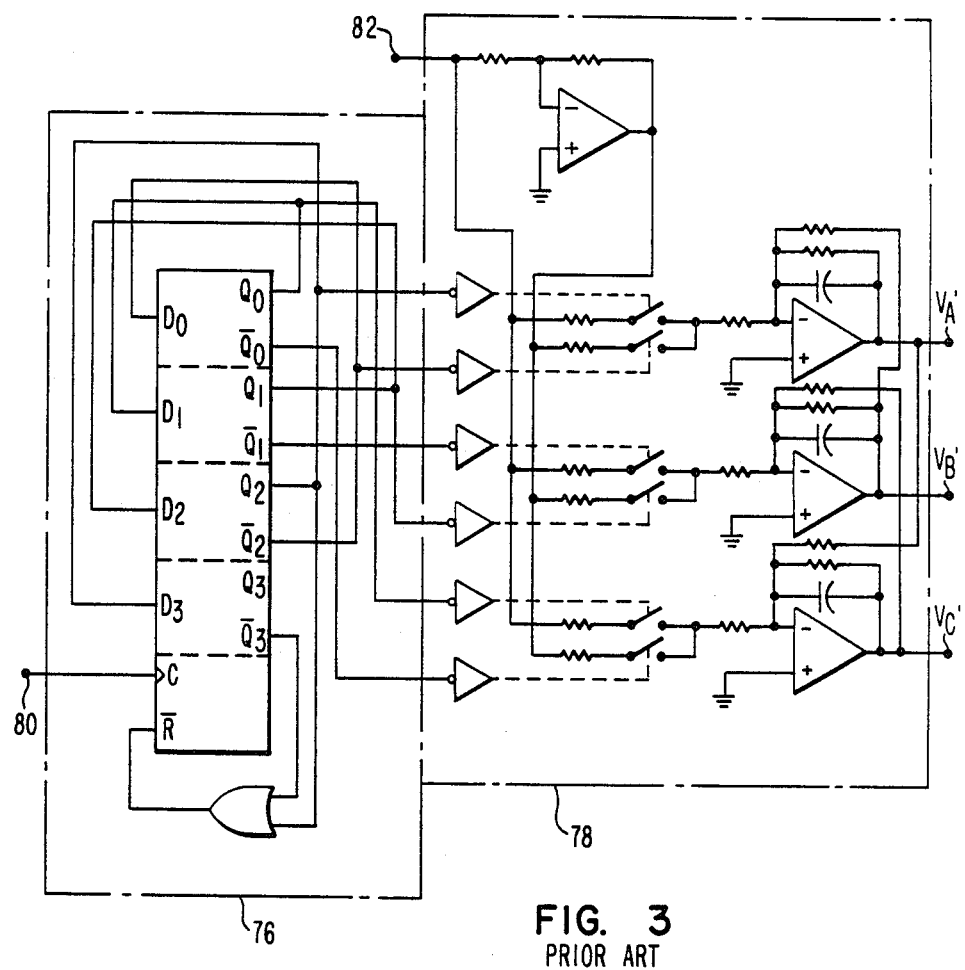
FIG. 3 is a schematic diagram of a prior art three phase digital synthesizer which may be used in the reference generator of FIG. 2.

FIG. 3 is a schematic diagram of the threephase digital synthesizer 72 of FIG. 2. This synthesizer includes a counter 76 and a bandpass sequence filter 78. The sequence filter is constructed in accordance with U.S. Pat. No. 4,479,160, issued Oct. 23, 1984 to Stacey. The output of the voltage controlled oscillator 70 in FIG. 2 is provided on line 80 to the digital synthesizer and the DC amplitude reference signal is supplied by way of terminal 82.

Figure 4:
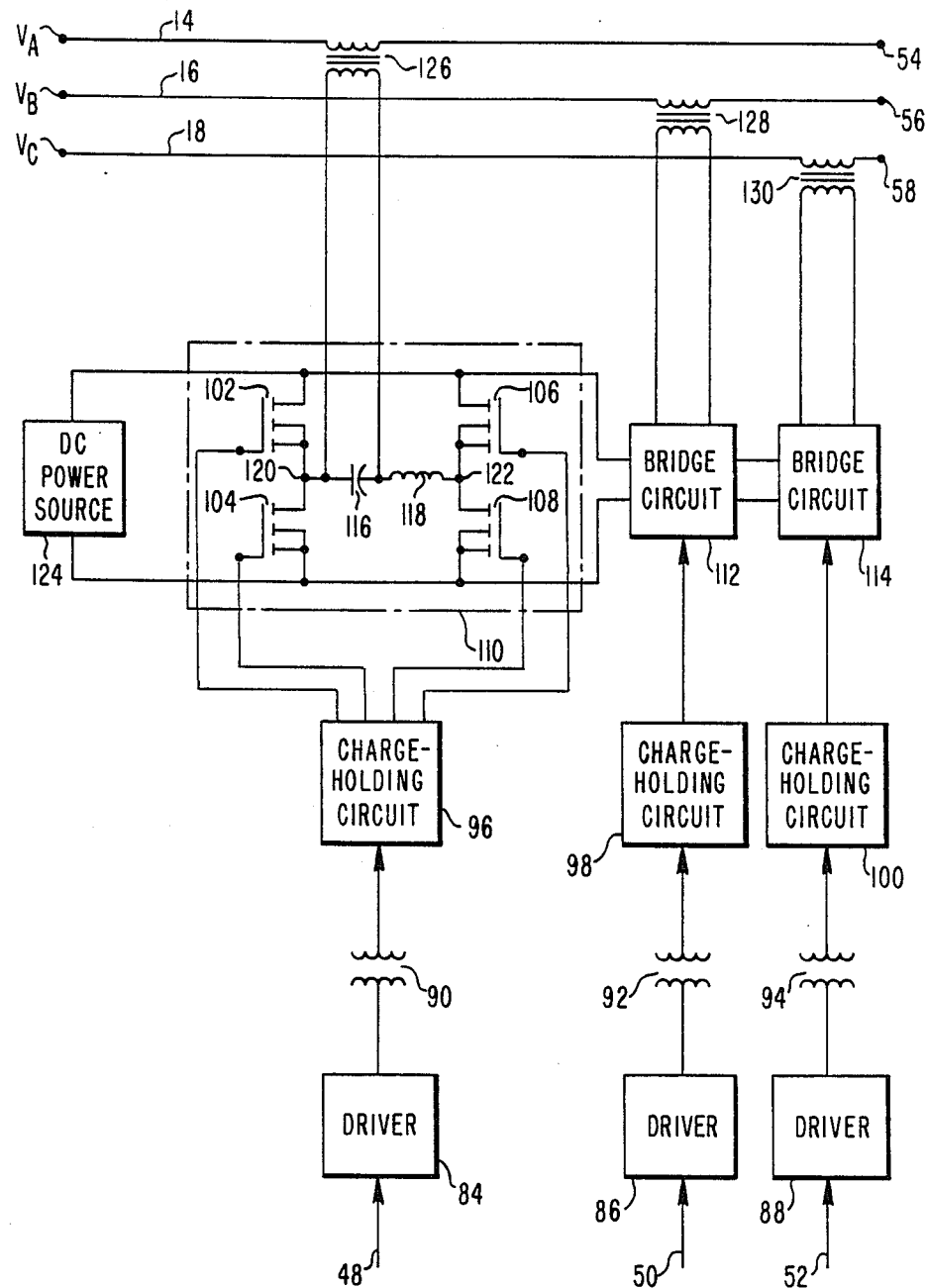
FIG. 4 is a block diagram of the power circuit of FIG. 1.

The error signals on lines 34, 36 and 38 of FIG. 1 are converted to pulse-width modulated signals when compared to the triangular wave by comparators 42, 44 and 46. The pulse width modulated outputs on lines 48, 50 and 52 are fed to the power circuit 12. FIG. 4 is a schematic diagram of the power circuit. Each pulse width modulated correction signal from the control circuit is amplified by driver circuits 84, 86 and 88. These driver circuits are coupled through transformers 90, 92 and 94 to charge holding circuits 96, 98 and 100 respectively. The charge holding circuits control the operation of a plurality of controllable switches such as the MOSFETs 102, 104, 106 and 108 in a plurality of bridge circuits 110, 112 and 114. Each of the bridge circuits includes a branch circuit comprising the series connector of a capacitor 116 and an inductor 118. This branch circuit is connected between a pair of output terminals 120 and 122. Each of these output terminals represents a junction point between two of the controllable switching devices. A DC power source 124 provides DC voltage to the bridge circuits.

In operation, the amplified correction signals appear across the capacitor 116 in the LC filter formed by the series connection of capacitor 116 and inductor 118. Summing transformers 126, 128 and 130 each have a primary winding connected across one of the bridge circuit capacitors and a secondary winding connected between the mains and the load. These summing transformers serve as means for combining the correction signals with the mains phase voltages by subtracting the correction signals from the mains voltages, thereby producing positive sequence load voltages of constant amplitude on the output lines 54, 56 and 58.

A power active filter constructed in accordance with this invention has been demonstrated on the output of a 20 kvA DC-link inverter used in airborne electrical generating applications. In this system, worst case distortion was reduced from 5.5% to 2.2%. Imbalance for ½ per unit load unbalance decreased from 6.4% to 2.7% and modulation went from 3.6% to less than 0.9%.

It should now be apparent that the present invention provides a power active filter which includes a multiple phase phase-locked loop, a positive sequence filter and a power amplifier to improve mains balance, and distortion and modulation characteristics. By utilizing a three-phase phase locked loop (which produces an accurate set of balanced fundamental frequency reference waveforms representing the wanted output components of a distorted and unbalanced source) to control three series connected power active filter elements to produce a substantially balanced, distortion free output, this invention minimizes the volt-amp rating requirements of the individual series connected power active filter elements. This results in size, weight and cost savings.

Although the present invention has been described in terms of what is at present believed to be its preferred embodiment, it will be apparent to those skilled in the art that various changes may be made without departing from the scope of the invention. It is therefore intended that the appended claims cover such changes.

What is claimed is:

1. A power active filter circuit for an electric power system comprising:
    means for generating a plurality of balanced, constant amplitude positive sequence reference voltages, each of said reference voltages being phase locked to a corresponding one of a plurality of phase voltages in an electric power system;
    means for producing a plurality of error signals, each of said error signals being proportional to the difference between one of said AC reference voltages and the corresponding one of said phase voltages;
    means for creating a plurality of pulse width modulated correction signals, each of said correction signals being proportional to one of said error signals;
    wherein said means for creating a plurality of correction signals includes a plurality of comparators, each of said comparators being connected to receive one of said error signals and a triangular wave and to produce one of said pulse width modulated correction signals representative of the relative amplitudes of the received error signal and triangular wave; and
    means for combining each of said correction signals with a corresponding one of said phase voltages, thereby producing a plurality of output voltages having substantially only a fundamental component.

2. A circuit as recited in claim 1, wherein:
    said means for generating said AC reference voltages comprises a sine wave synthesizer for synthesizing said plurality of balanced, constant amplitude AC reference voltages in response to an oscillating signal; a multiphase phase locked loop having inputs for receiving said AC reference voltages and said phase voltages, said multiphase phase locked loop producing a control signal representative of the sum of a plurality of quantities each of said quantities being equal to one of said phase voltages multiplied by the difference between a non-corresponding two of said AC reference voltages; and means for creating said oscillating signal in response to said control signal; and
    wherein said means for creating said oscillating signal comprises an integrator for integrating said control signal; and a voltage controlled oscillator for producing said oscillating signal in response to said integrated control signal.

3. A circuit as recited in claim 1, wherein said means for combining comprises:
    a plurality of bridge networks of controllable switches, each of said bridge networks including a pair of DC input terminals and a pair of AC output terminals;
    a DC power source connected across each of said pairs of DC input terminals;

a plurality of branch circuits each including a capacitor and an inductor electrically connected in series, each of said branch circuits being connected across said one of said pairs of AC output terminals;

a plurality of transformers, each of said transformers having a first winding connected across one of said capacitors and a second winding connected in series with one phase of said electric power system; and a plurality of drive circuits for controlling the operation of said controllable switches in response to said pulse width modulated waves.

4. A method of filtering a plurality of phase voltages of a multiple phase electric power system, said method comprising the steps of:

synthesizing a plurality of balanced, constant amplitude positive sequence AC reference voltages in response to an oscillating signal, each of said reference voltages being phase locked to a corresponding one of a plurality of phase voltages of a multiple phase electric power system;

passing said AC reference voltages and said phase voltages into a multiple phase phase-locked loop to produce a control signal representative of the sum of a plurality of quantities, each of said quantities being equal to one of said phase voltages multiplied by the difference between a non-corresponding two of said AC reference voltages;

integrating the control signal;

producing said oscillating signal in response to the integrated control signal;

producing a plurality of error signals, each of said error signals being proportional to the difference between one of said AC reference voltages and a corresponding one of said phase voltages;

comparing each one of said error signals with a triangular wave to produce a plurality of pulse width modulated correction signals, each of said correction signals being proportional to one of said error signals; and combining each of said correction signals with a corresponding one of said phase voltages, thereby producing a plurality of output voltages having substantially only a fundamental component.

5. The method of claim 4, wherein the combining step comprises the steps of:

connecting a DC power source to a pair of DC input terminals on a bridge network of controllable switches;

connecting a branch circuit comprising the series connection of a capacitor and an inductor between a pair of AC output terminals on said bridge network;

connecting a first winding of a transformer in parallel with said capacitor and connecting a second winding of said transformer in series with one phase of said electric power system; and operating said controllable switches in response to said pulse width modulated wave.

* * * * *